(12) United States Patent
Koifman et al.

(10) Patent No.: US 10,076,794 B2
(45) Date of Patent: Sep. 18, 2018

(54) STAR-SHAPED CUTTING INSERT FOR A FRONT AND BACK CHAMFERING ROTARY MILLING CUTTER

(71) Applicant: Iscar, Ltd., Tefen (IL)

(72) Inventors: Alexander Koifman, Kfar Vradim (IL); Alexander Passov, Haifa (IL); Andrei Petrilin, Haifa (IL)

(73) Assignee: Iscar, Ltd., Tefen (IL)

( * ) Notice: Subject to any disclaimer, the term of this patent is extended or adjusted under 35 U.S.C. 154(b) by 199 days.

(21) Appl. No.: 15/206,562

(22) Filed: Jul. 11, 2016

(65) Prior Publication Data

US 2018/0009044 A1   Jan. 11, 2018

(51) Int. Cl.
  *B23C 5/02*   (2006.01)
  *B23C 5/20*   (2006.01)
  *B23C 5/10*   (2006.01)
  *B23C 3/12*   (2006.01)

(52) U.S. Cl.
  CPC ............ *B23C 5/207* (2013.01); *B23C 3/12* (2013.01); *B23C 5/109* (2013.01); *B23C 2200/0466* (2013.01); *B23C 2200/167* (2013.01); *B23C 2200/205* (2013.01); *B23C 2220/16* (2013.01)

(58) Field of Classification Search
  CPC ...... B23C 2200/0466; B23C 2200/167; B23C 2200/205; B23C 2220/16; B23C 5/207; B23C 5/109; B23C 3/12
  See application file for complete search history.

(56) References Cited

U.S. PATENT DOCUMENTS

| | | | |
|---|---|---|---|
| 3,520,042 | A | 7/1970 | Stier |
| 4,755,085 | A | 7/1988 | Murén et al. |
| 5,913,643 | A | 6/1999 | Fowler et al. |
| 6,074,137 | A | 6/2000 | Betman et al. |
| 6,527,485 | B1 | 3/2003 | Little |

(Continued)

FOREIGN PATENT DOCUMENTS

| | | |
|---|---|---|
| GB | 2081142 | 2/1982 |
| JP | 2000071107 | 3/2000 |
| WO | WO 98/01249 | 1/1998 |

OTHER PUBLICATIONS

International Search Report dated Nov. 14, 2017, issued in PCT counterpart application (No. PCT/IL2017/050672).

(Continued)

*Primary Examiner* — Alan Snyder
(74) *Attorney, Agent, or Firm* — Womble Bond Dickinson (US) LLP

(57) ABSTRACT

A front and back chamfering rotary milling cutter includes a cutter body including an insert pocket and a star-shaped indexable cutting insert releasably retained in the pocket. The cutting insert has star-shaped upper and lower surfaces connected by a peripheral surface intersecting each of the upper and lower surfaces. The cutting insert includes a plurality of circumferentially alternating inner and outer corner portions. A cutting portion is defined by each outer corner portion together with an adjacent first inner corner portion rotationally forward thereof and an adjacent second inner corner portion located rotationally rearward thereof. Each cutting portion includes a front chamfering cutting edge extending from the outer corner portion to the first inner corner portion and a back chamfering cutting edge extending from the outer corner portion to the second inner corner portion.

25 Claims, 4 Drawing Sheets

(56) References Cited

U.S. PATENT DOCUMENTS

| | | |
|---|---|---|
| 7,441,991 B2 | 10/2008 | Yanagimoto |
| 7,597,508 B2 | 10/2009 | Hecht |
| 7,713,005 B2 | 5/2010 | Rieth |
| 7,735,401 B2 | 6/2010 | Stojanovski |
| 8,678,718 B2 | 3/2014 | Hecht |
| 2010/0329800 A1 | 12/2010 | Edler et al. |
| 2013/0243537 A1 | 9/2013 | Ogata |
| 2013/0309028 A1 | 11/2013 | Chistyakov |
| 2013/0336733 A1 | 12/2013 | Hecht et al. |
| 2014/0050542 A1 | 2/2014 | Zeeb et al. |
| 2014/0341661 A1 | 11/2014 | Lin et al. |
| 2016/0016234 A1 | 1/2016 | Hecht |
| 2016/0082519 A1 | 3/2016 | Hecht |

OTHER PUBLICATIONS

Written Opinion dated Nov. 14, 2017, issued in PCT counterpart application (No. PCT/IL2017/050672).

STAR-SHAPED CUTTING INSERT FOR A FRONT AND BACK CHAMFERING ROTARY MILLING CUTTER

FIELD OF THE INVENTION

The subject matter of the present application relates to rotary cutting tools in general and to rotary milling cutters in particular and to rotary milling cutters that can perform front and back chamfering further in particular.

BACKGROUND OF THE INVENTION

Cutting tools can be provided with cutting edges that are configured to perform, in particular, front and/or back chamfering cutting operations. It is noted that front chamfering, also known simply as chamfering, refers to beveling a top edge of a work-piece, while back chamfering refers to beveling a bottom edge of a work-piece.

Some such cutting tools are milling cutting tools with chamfering cutting inserts releasably attached thereto. Examples of such cutting tools are disclosed in U.S. Pat. Nos. 5,913,643 and 7,713,005 B2.

Other such cutting tools are milling cutting tools that are integrally formed. Examples of such cutting tools are disclosed in, for example, US 2014/0341661 A1 and U.S. Pat. No. 7,441,991 B2

Yet other cutting tools are turning cutting tools, typically boring bars, with chamfering cutting inserts releasably attached thereto. Examples of such cutting tools are disclosed in, for example, and U.S. Pat. No. 7,735,401 B2 and WO 98/01249.

It is an object of the subject matter of the present application to provide a new and improved rotary milling cutter for front and back chamfering.

It is a further object of the subject matter of the present application to provide a rotary milling cutter having at least one chamfering cutting insert releasably attached thereto.

It is a yet further object of the subject matter of the present application to provide a rotary milling cutter having at least one chamfering cutting insert that is indexable with an increased number of indexable positions.

It is a yet still further object of the subject matter of the present application to provide a rotary milling cutter that can perform non-hole chamfering and hole chamfering.

SUMMARY OF THE INVENTION

In accordance with a first aspect of the subject matter of the present application there is provided a front and back chamfering rotary milling cutter, having an axis of rotation around which the rotary milling cutter rotates in a direction of rotation, the axis of rotation extending in a forward to rearward direction, the rotary milling cutter comprising:
  a cutter body comprising an insert pocket; and
  a star-shaped cutting insert releasably retained in the insert pocket, the cutting insert comprising:
    opposing insert top and bottom surfaces and an insert peripheral surface extending therebetween;
    a centrally located insert axis extending through the insert top and bottom surfaces;
    circumferentially alternating outer and inner corner portions, the inner corner portions being located closer to the insert axis than the outer corner portions; wherein
    each outer corner portion together with an adjacent first inner corner portion rotationally forward thereof and an adjacent second inner corner portion located rotationally rearward thereof define a cutting portion;
    each cutting portion comprising a cutting edge formed at the intersection of the insert top and peripheral surfaces; and
    the cutting edge comprises a front chamfering cutting edge extending from the outer corner portion to the first inner corner portion and a back chamfering cutting edge extending from the outer corner portion to the second inner corner portion.

In accordance with a second aspect of the subject matter of the present application, there is also provided a double-sided star-shaped cutting insert, comprising
  opposing insert top and bottom surfaces and an insert peripheral surface extending therebetween;
  a centrally located insert axis extending through the insert top and bottom surfaces, the cutting insert being indexable on each of the insert top and bottom surfaces about the insert axis;
  circumferentially alternating outer and inner corner portions, the inner corner portions being located closer to the insert axis than the outer corner portions;
  a plurality of cutting portions, each cutting portion defined by one of said outer corner portions, an adjacent first inner corner portion rotationally forward thereof and an adjacent second inner corner portion located rotationally rearward thereof;
  a median plane passing through the insert peripheral surface midway between the top and bottom surfaces;
  a bisector plane formed at each cutting portion, each bisector plane containing the insert axis, and bisecting both an associated outer corner portion and an associated opposite inner corner portion;
  a median axis formed at an intersection of each bisector plane and the median plane, each median axis intersecting the insert axis, and passing through both an associated outer corner portion and an associated opposite inner corner portion; wherein:
    each cutting portion comprising a cutting edge formed at the intersection of the insert top and peripheral surfaces;
    each cutting edge comprises a front chamfering cutting edge extending from the outer corner portion to the first inner corner portion and a back chamfering cutting edge extending from the outer corner portion to the second inner corner portion;
    the cutting insert has a number N cutting portions and is N-way indexable on both the top and bottom surfaces, N being 3, 5, 7 or 9;
    the cutting insert is mirror symmetrical about the median plane;
    the cutting insert is mirror symmetrical about each bisector plane;
    the cutting insert is 180° rotationally symmetrical about each median axis; and
    the cutting insert is devoid of cutting edges which extend between top and bottom surfaces in a thickness direction of the cutting insert parallel to the insert axis.

It is understood that the above-said is a summary, and that features described hereinafter may be applicable in any combination to the subject matter of the present application, for example, any of the following features may be applicable to the rotary milling cutter and/or cutting insert:

The outer and inner corner portions can be distanced at two different radii, an outer radius and an inner radius, from the insert axis, respectively.

The cutting insert can exhibit rotational symmetry about the insert axis.

The cutting insert can be double-sided and each cutting portion can comprise an additional cutting edge formed at the intersection of the insert bottom and peripheral surfaces.

At least one of the front and back chamfering cutting edges can be straight.

The insert pocket can be located at a forward end of the cutter body.

The cutting edge can comprise a curved non-operative corner edge extending between the front and back chamfering cutting edges.

The first length of the non-operative corner edge is less than 25% of the second length of either the front or back chamfering cutting edges.

The cutter body comprises a shank peripheral surface extending circumferentially around the axis of rotation. The front and back chamfering cutting edges of one of the cutting portions can be disposed radially outwardly with respect to the shank peripheral surface, defining an active cutting portion.

The front and back chamfering cutting edges of the remaining cutting portions can be disposed radially inwardly with respect to the shank peripheral surface, defining a plurality of non-active cutting portions.

In a side view of the rotary milling cutter, a bisector angle is formed with the rearward direction of the axis of rotation and a bisector of the outer corner portion of the active cutting portion. The bisector angle can be in range $70° \leq \beta \leq 110°$.

The bisector angle can be exactly 90°.

The cutting insert comprises exactly N cutting portions. N can be greater or equal to 3 and less than or equal to 9.

N can be equal to 5.

N can be an odd number.

The rotary milling cutter can comprise exactly one cutting insert.

The cutter body comprises a shank peripheral surface extending circumferentially around the axis of rotation. The shank peripheral surface has a shank diameter. In a side view of the rotary milling cutter, the insert axis is distanced from the axis of rotation by an axis distance. The axis distance is less than 25% of the shank diameter.

The shank peripheral surface has a shank diameter. The outer corner portions define an imaginary outer circle having an insert diameter. The insert diameter can be larger than the shank diameter.

In a plan view of the cutting insert, the front chamfering cutting edge on any given cutting portion and the adjacent back chamfering cutting edge rotationally forward thereof can converge towards each other in a radially inward direction with respect to the insert axis.

The front and back chamfering rotary milling cutter, has an axis of rotation around which the rotary milling cutter rotates in a direction of rotation, the axis of rotation extending in a forward to rearward direction, the rotary milling cutter can comprise a cutter body comprising an insert pocket a cutting insert releasably retained in the insert pocket.

The cutter body can comprises a shank peripheral surface extending circumferentially around the axis of rotation. The front and back chamfering cutting edges of one of the cutting portions can be disposed radially outwardly with respect to the shank peripheral surface, defining an active cutting portion. In a side view of the rotary milling cutter, a bisector angle is formed with the rearward direction of the axis of rotation and a bisector of outer corner portion of the active cutting portion. The bisector angle can be in range $70° \leq \beta \leq 110°$.

BRIEF DESCRIPTION OF THE FIGURES

For a better understanding of the present application and to show how the same may be carried out in practice, reference will now be made to the accompanying drawings, in which.

Figure 1:
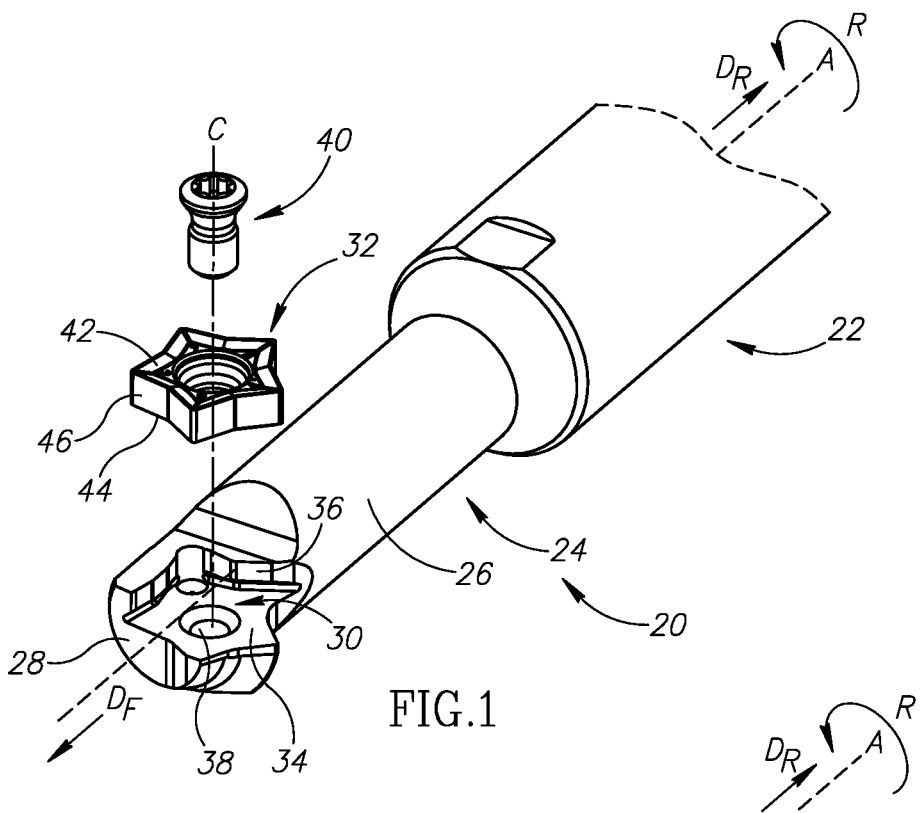
FIG. 1 is an exploded perspective view of a rotary milling cutter having one cutting insert.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
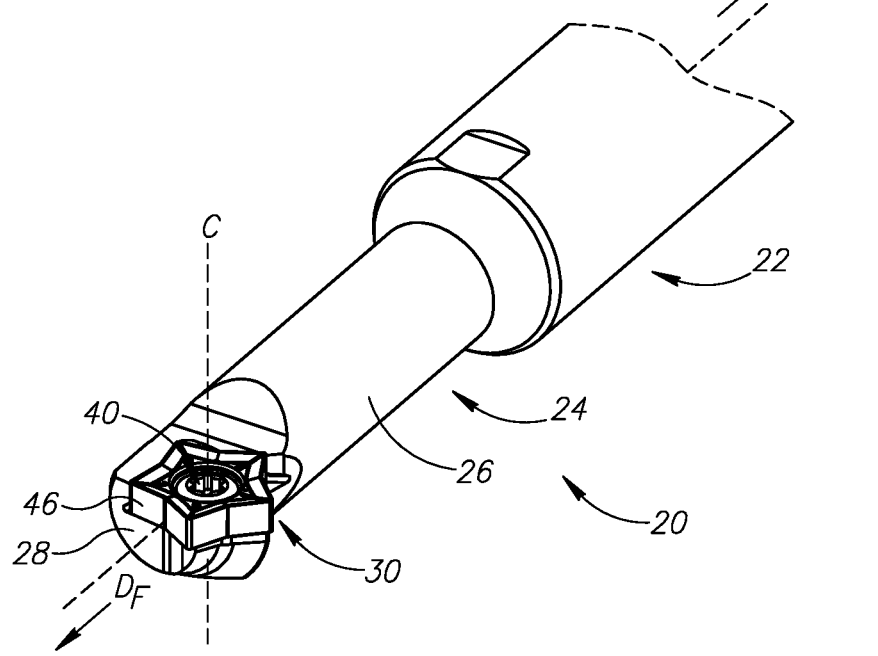
FIG. 2 is a perspective view of the rotary milling cutter shown in FIG. 1.

Attention is first drawn to FIGS. 1 and 2 showing a front and back chamfering rotary milling cutter 20 of the type used for milling operations, in particular for front and back chamfering of non-holes and holes, in accordance with embodiments of the subject matter of the present application. It is appreciated that throughout the description non-hole chamfering refers to the beveling of a corner edge of a work-piece where the corner edge is non-circular and hole chamfering, also known as circular interpolation chamfering, refers to the beveling of a corner edge at the opening of a pre-made hole. It is noted that the rotary milling cutter 20 is also suitable for other cutting operations such as, but not limited to, side slotting (i.e. cutting a groove in a work piece) and countersinking. The rotary milling cutter 20 has an axis of rotation A, around which the rotary milling cutter 20 rotates in a direction of rotation R. The axis of rotation A extends in a forward $D_F$ to rearward direction $D_R$. It should be appreciated that use of the terms "forward" and "rearward" throughout the description and claims refer to a relative position in a direction of the head longitudinal axis A towards the left and right, respectively, in FIG. 3. In this non-limiting example shown in the drawings, the rotary milling cutter 20 is a right handed rotary milling cutter.

Figure 3:
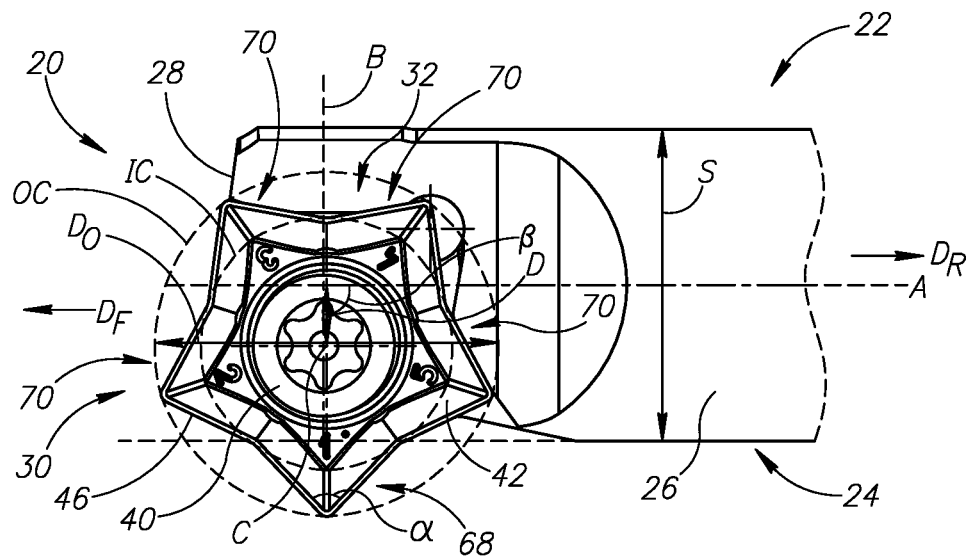
FIG. 3 is a side view of the rotary milling cuter shown in FIG. 2.
Figure 4:
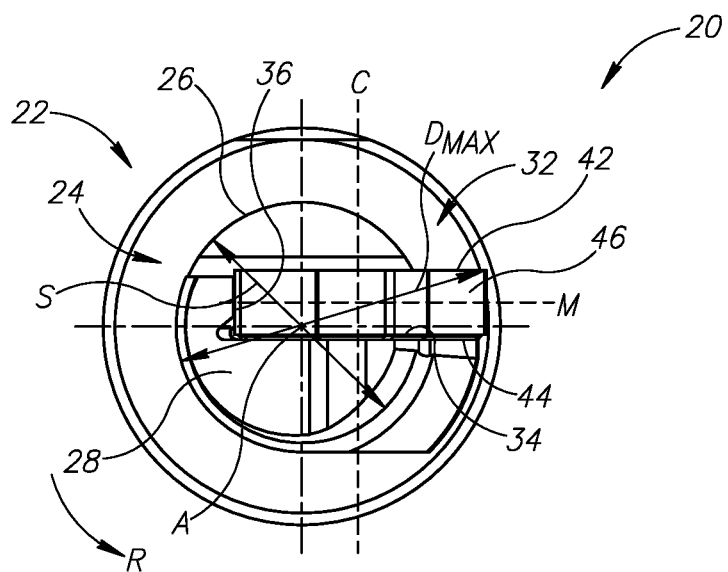
FIG. 4 is an end view of the rotary milling cuter shown in FIG. 2.

Referring now also to FIGS. 3 and 4, the rotary milling cutter 20 includes a cutter body 22. The cutter body 22 can be typically made from steel. The cutter body 22 includes a shank portion 24 that includes a shank peripheral surface 26 that extends circumferentially around the axis of rotation A. The shank peripheral surface 26 can have a shank diameter S, as measured in a direction perpendicular to the axis of rotation A. The shank portion 24 includes a shank front surface 28 at a forward end of the shank portion 24 that is delimited by the shank peripheral surface 26. The shank portion 24 includes an insert pocket 30 designed for releasably retaining a cutting insert 32 therein. That is to say, the cutter body 22 includes the insert pocket 30. In the description hereinafter references are made to one insert pocket 30 but it is understood that the cutter body 22 in accordance with the subject matter of the present application can include more than one insert pocket 30. The insert pocket 30 is recessed in the shank peripheral surface 26. As can be seen in FIGS. 1 and 4, the insert pocket 30 can include a pocket base surface 34, and a pocket peripheral surface 36 oriented substantially perpendicularly thereto and forming a partial boundary thereof. In this non-limiting example shown in the drawings, a pocket threaded bore 38 can be recessed in, and open out to, the pocket base surface 34. The pocket threaded bore 38 is designed to threadingly receive a retaining screw 40 in order to releasably retain the cutting insert 32 in the insert pocket 30. In accordance with some embodiments of the subject matter of the present application, the insert pocket 30 can be located at a forward end of the cutter body 22 and opens out to the shank front surface 28.

Figure 5:
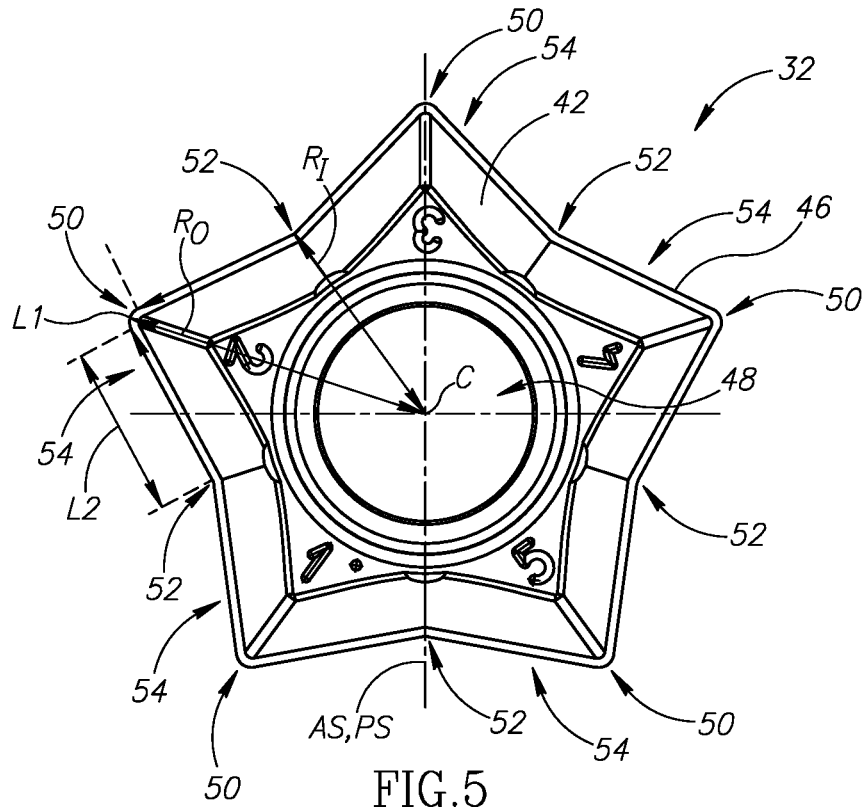
FIG. 5 is a plan view of a cutting insert in accordance with the present invention.
Figure 6:
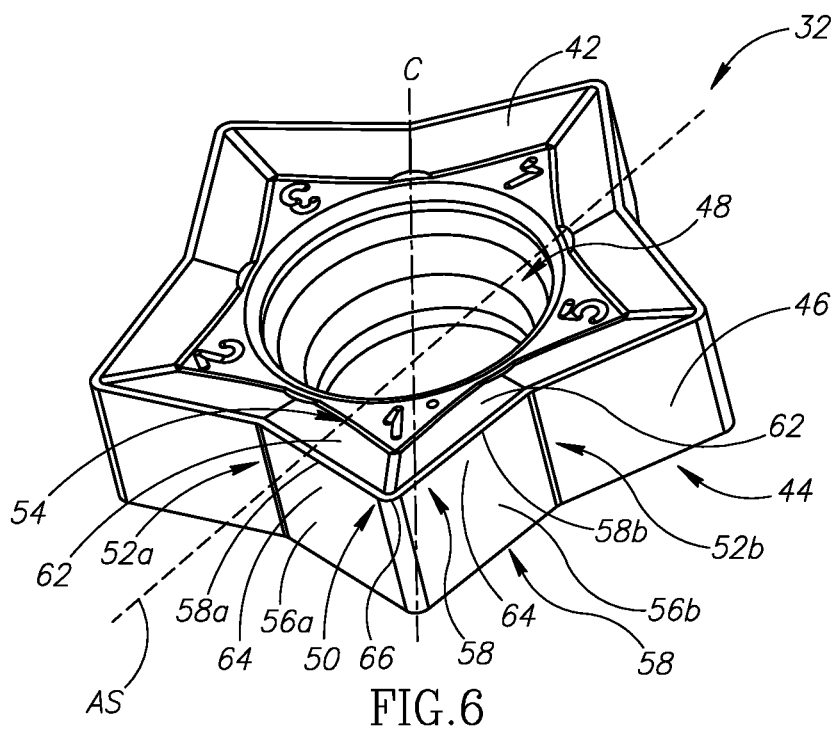
FIG. 6 is a perspective view of the cutting insert shown in FIG. 5.
Figure 7:
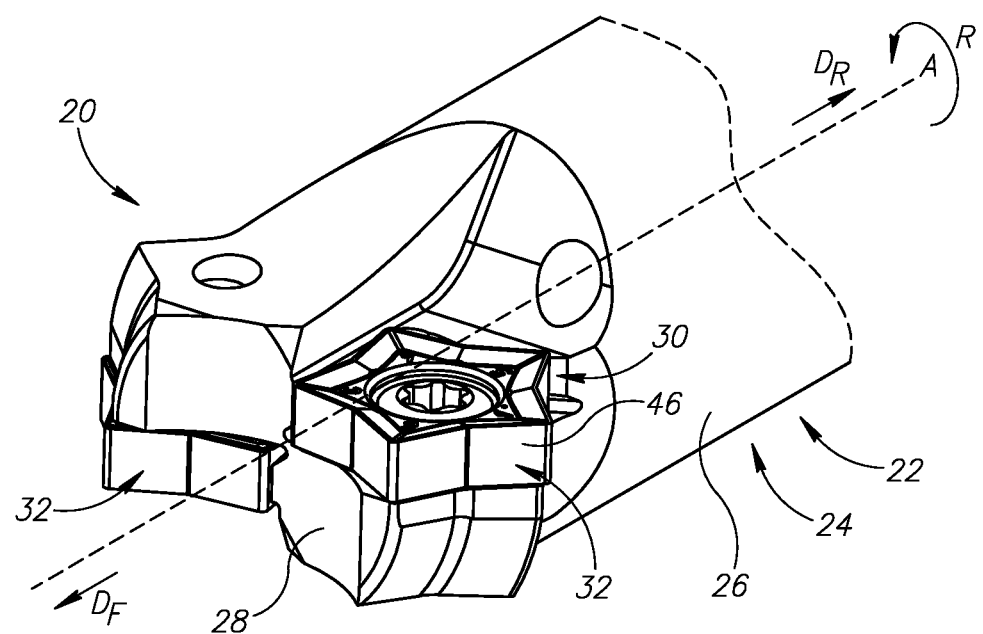
FIG. 7 is a perspective view of another rotary milling cutter in accordance with the present invention having two cutting inserts.

Reference is now made to FIGS. 5 and 6. The rotary milling cutter 20 includes a cutting insert 32. In the description hereinafter references are made to one cutting insert 32 but it is understood that the rotary milling cutter 20 in accordance with the subject matter of the present application can include more than one cutting insert 32. The cutting insert 32 can be made from cemented carbide The cutting insert 32 includes insert top and bottom surfaces 42, 44 that oppose each other and an insert peripheral surface 46 that extends between the insert top and bottom surfaces 42, 44. The cutting insert 32 has an insert axis C that extends through the insert top and bottom surfaces 42, 44, at central portions thereof. That is to say, the insert axis C is centrally located. Reverting back to FIG. 4, the cutting insert 32 has an insert median plane M perpendicular to the insert axis C and passing through the insert peripheral surface 46. The insert median plane M is located midway between the insert top and bottom surfaces 42, 44.

The cutting insert 32 is a lay-down (i.e. non-tangential) insert and is releasably retained in the insert pocket 30. It is noticed, that, in this non-limiting example shown in the drawings, the cutting insert 32 is formed with a clamping through hole 48 located in the middle thereof (see FIGS. 4 and 5, for example) which opens out to the insert top and bottom faces 42, 44 and is configured for receiving a clamping member (for example, the retaining screw 40) therethrough. The clamping through hole 48 can extend along the insert axis C. It is understood that alternative methods of fastening a cutting insert 32 to a cutter body 22 could be employed, for example clamping jaws, and therefore such cutting inserts could be devoid of, or include a differently shaped, clamping through hole 48. When the cutting insert 32 is retained in the insert pocket 30 a portion of the insert bottom surface 44 abuts a corresponding region of the pocket base surface 34 and portion(s) of the insert peripheral surface 46 abut corresponding region(s) of the pocket peripheral surface 36.

In a plan view of the cutting insert 32 taken along the insert axis C (i.e. FIG. 5), the cutting insert 32 is star-shaped. The cutting insert 32 includes a number N of outer corner portions 50, where N is a positive integer. The cutting insert 32 also includes a corresponding number (i.e. N) of inner corner portions 52 that alternate circumferentially with the outer corner portions 50. Thus, each inner corner portion 52 is interposed between two adjacent outer corner portions 50. The inner corner portions 52 are located closer to the insert axis C than the outer corner portions 50. The outer corner portions 50 are interior corners and the inner corner portions 52 are exterior corners. Clearly, the star-shape of the cutting insert 32 has N points. In accordance with some embodiments of the subject matter of the present application, the outer corner portions 50 can define an imaginary outer circle OC having an outer radius $R_O$ and an outer diameter $D_O$. Likewise, the inner corner portions 52 can define an imaginary inner circle IC having an inner radius $R_I$. Thus, the outer corner portions 50 and inner corner portions 52 can be distanced at two different radii, the outer radius $R_O$ and the inner radius $R_I$, from the insert axis C respectively, where the outer radius $R_O$ is greater than the inner radius $R_I$. Each inner corner portion 52 can be located peripherally midway between two adjacent outer corner portions 50.

The cutting insert 32 can exhibit rotational symmetry about the insert axis C. N can be greater or equal to 3 and less than or equal to 9. Beyond the maximum value in this range the benefit of increased indexability is somewhat negated by a reduction in the length of chamfer that can be achieved. Preferably, N can be equal to 5 so that a high level of indexability is achieved while maintaining satisfactory length of chamfer. In accordance with some embodiments of the subject matter of the present application N can be an odd number. Advantageously, when the cutting insert 32 has an odd number of cutting portions 50 then the region of the cutting insert 32 diametrically opposite the active cutting portion 68 is devoid of a non-active cutting portion 70. Thus, the inert pocket 30 is not detrimentally weakened by being configured to accommodate a non-active cutting portion 70 proximate the shank peripheral surface 26.

Referring particularly to FIG. 6, each pair of adjacent inner corner portions 52 and the outer corner portion 50 located circumferentially therebetween define a cutting portion 54. The adjacent inner corner portion 52 rotationally forward of any given outer corner portion 50 forms a first inner corner portion 52a. The adjacent inner corner portion 52 rotationally rearward of the given outer corner portion 50 forms a second inner corner portion 52b. Thus, stated differently, each cutting portion 54 is formed by one of the outer corner portion 50 together with the first and second inner corner portions 52a, 52b. It should be appreciated that use of the term "rotationally forward" and "rotationally rearward" throughout the description and claims is with respect to the clockwise direction about the insert axis C, in a plan view of cutting insert 32. Clearly, the number of cutting portions 54 corresponds to the number of outer corner portions 50 (i.e. N).

In a plan view of the cutting insert 32 (i.e. FIG. 5), the insert peripheral surface 36 on each cutting portion 54 includes a rotationally forward peripheral surface 56a and a rotationally rearward peripheral surface 56b. The rotationally forward and rearward peripheral surfaces 56a, 56b are separated by the outer corner portion 50.

Each cutting portion 54 includes a cutting edge 58 formed at the intersection of the insert top and peripheral surfaces 42, 46. The cutting edge 58 includes a front chamfering cutting edge 58a that extends from the outer corner portion 50 to the first inner corner portion 52a. The cutting edge 58 includes a back chamfering cutting edge 58b that extends from the outer corner portion 50 to the second inner corner portion 52b. Thus, the front and back chamfering cutting edges 58a, 58b are formed on opposite sides of one of the outer corner portion 50. The portion of the insert top surface 42 adjacent the front and back cutting edges and extending away therefrom act as rake surfaces 62. The portion of the insert peripheral surface 46 adjacent the front and back cutting edges and extending away therefrom act as relief surfaces 64. In accordance with some embodiments of the subject matter of the present application, each cutting edge 58 can include a non-operative corner edge 66 extending between the front and back chamfering cutting edges 58a, 58b that is not designed for cutting operations. That is to say, the front and back chamfering cutting edges 58a, 58b can be separated by the non-operative corner edge 66. The non-operative corner edge 66 can be located at the outer portion 50. The non-operative corner edge 66 is not designed or required to perform any cutting. Referring to FIG. 5, the non-operative corner edge 66 has a first length L1. The front and back chamfering cutting edges 58a, 58b can have a second length L2. The first length L1 can be less than 25% of the second length L2. The non-operative corner edge 66 can be curved and optionally have a radius of curvature. At least one of the front and back chamfering cutting edges 58a, 58b can be straight. Preferably, both can be straight. In such a configuration, the cutting portions 54 can have a triangular shape in a plan view of the cutting insert 32. In a plan view of the cutting insert 32, the front chamfering cutting edge 58a on any given cutting portion 54 and the adjacent back chamfering cutting edge 58b rotationally forward thereof (i.e. on a different cutting portion 54) can converge towards each other in a radially inward direction with respect to the insert axis C. Thus, said front and back chamfering cutting edge 58a, 58b can define an exterior angle that is less than 180°.

In accordance with some embodiments of the subject matter of the present application, the cutting insert 32 can be double-sided. That is to say, each cutting portion 54 can include an additional cutting edge 58 formed at the intersection of the insert bottom and peripheral surfaces 44, 46. Thus, the cutting insert 32 can be reversed so that the insert top surface 42 becomes the insert bottom surface 44 and vice versa, thereby doubling the number of cutting edges on the cutting insert 32. When the cutting insert 32 is double-sided it can be mirror symmetrical about the insert median plane M.

In some embodiments, in a plan view of the insert, each of the cutting portions 54 has a bisector plane PS which contains the insert axis C, and bisects both an associated outer corner portion 50 and an associated opposite inner corner portion 52. Thus, in a plan view, the insert may be mirror symmetrical about each of the bisector planes PS. Each bisector plane PS intersects the median plane M at a median axis AS which intersects the insert axis C, and passes through both an associated outer corner portion 50 and an associated opposite inner corner portion 52. Thus, a double-sided insert may have 180° rotational symmetry about each median axis AS. And in a double-sided embodiment where N=5, as seen in FIGS. 5 and 6, the insert may having five cutting portions 54, be five-way indexable on each of the top and bottom surfaces 42, 44, mirror symmetrical about the median plane M, mirror symmetrical about each of the N=5 bisector planes PS, and 180° rotational symmetrical about each of the N=5 median axes. Furthermore, and as seen in FIG. 6, such an insert may also be devoid of cutting edges which extend between the top and bottom surfaces 42, 44 in a thickness direction of the insert parallel to the insert axis C.

Referring back to FIG. 3, in accordance with some embodiments of the subject matter of the present application, any given cutting insert 32 is oriented such that the front and back chamfering cutting edges 58a, 58b of one of the cutting portions 54 can be disposed radially outwardly with respect to the shank peripheral surface 26, defining an active cutting portion 68. By virtue of such a configuration, the shank peripheral surface 26 does not interfere with the work-piece when the rotary milling cutter 20 is performing chamfering cutting operations. For said given cutting insert 32, the front and back chamfering cutting edges 58a, 58b of the remaining cutting portions 54 can be disposed radially inwardly with respect to the shank peripheral surface 26, defining a plurality of non-active cutting portions 70. By virtue of such a configuration, the non-active cutting portions 70 do not interfere with the work-piece when the rotary milling cutter 20 is performing metal cutting operations. It is noted that the active cutting portion 68 is the most radially outward of all the cutting portions 54.

The cutting insert 32 can be indexed by rotating the cutting insert 32 about the insert axis C so that one of the non-active cutting portions 70 becomes the active cutting portion 68. It is noted that, unlike known milling cutters that have trigon and square shaped cutting inserts that can perform front and back chamfering, in such indexing a back chamfering cutting edge does not become a front chamfering cutting edge or vice versa.

Referring back to FIG. 3, in a side view of the rotary milling cutter 20, the front chamfering cutting edge 58a of the active cutting portion 68 is inclined towards the axis of rotation A in the forward direction $D_F$, thus allowing the front chamfering cutting edge 58a to perform front chamfering. Similarly, the back chamfering cutting edge 58b of the active cutting portion 68 is inclined towards the axis of rotation A in the rearward direction $D_F$, thus allowing the back chamfering cutting edge 58b to perform back chamfering. By such a configuration, any given cutting portion 54 can perform front and back chamfering cutting operations, and by virtue thereof the rotary milling cutter can perform side slotting.

Moreover, the front and back chamfering cutting edges 58a, 58b of the active cutting portion 68 form a corner angle α having a bisector B that forms a bisector angle β with the rearward direction $D_R$ of the axis of rotation A. That is to say, the bisector angle β is formed with the rearward direction $D_R$ of the axis of rotation A and the outer corner portion 50 of the active cutting portion 68. It is understood that the bisector B of corner angle α is coincident with one of the aforementioned bisector planes PS. It should also be appreciated that use of the term "side view of the rotary milling cutter" throughout the description and claims refer to a side view of the rotary milling cutter 20, as viewed in a direction parallel to the insert axis C of one of the cutting inserts 32, as shown in FIG. 3, for example. In accordance with some embodiments of the subject matter of the present application, and the bisector angle β can be in range 70°≤β≤110°. Preferably, the bisector angle β can be exactly 90°.

In accordance with some embodiments of the subject matter of the present application, the rotary milling cutter 20 can include exactly one cutting insert 32. In a side view of the rotary milling cutter 20 the insert axis C is distanced from the axis of rotation A by an axis distance D. The axis distance D can be less than 25% of the shank diameter S (where the insert axis C is on the same side of the axis of rotation A as the active cutting portion 68). This allows larger cutting inserts 32 to be retained in the inserts pockets 30. For example, the outer diameter $D_O$ of the cutting insert 32 can be larger than the shank diameter S of the cutter body 22.

Alternatively, in accordance with some other embodiments of the subject matter of the present application, the rotary milling cutter 20 can include exactly two or three cutting inserts 32.

It should be noted that by virtue of the milling cutter 20 being a rotary cutting tool (i.e. rotating about an axis when performing a cutting operation while the work-piece is stationary, unlike, for example, turning cutting tools where the work-piece rotates about an axis) the rotary milling cutter 20 can perform front hole and non-hole chamfering.

It should be further be noted that when the axis distance D is less than 25% of the shank diameter S (for rotary milling cutters 20 with one cutting insert 32), the maximum tool dimension $D_{MAX}$ of the rotary milling cutter 20, as measured in a plane perpendicular to the axis of rotation A is reduced, thus allowing the rotary milling cutter 20 to enter and back chamfer holes of smaller diameter as compared to other hole chamfering tools known in the art.

Although the subject matter of the present application has been described to a certain degree of particularity, it should be understood that various alterations and modifications could be made without departing from the spirit or scope of the invention as hereinafter claimed.

What is claimed is:

1. A front and back chamfering rotary milling cutter (20), having an axis of rotation (A) around which the rotary milling cutter (20) rotates in a direction of rotation (R), the axis of rotation (A) extending in a forward ($D_F$) to rearward direction ($D_R$), the rotary milling cutter (20) comprising:
   a cutter body (22) comprising an insert pocket (30); and
   a star-shaped cutting insert (32) releasably retained in the insert pocket (30), the cutting insert (32) comprising:
      opposing insert top and bottom surfaces (42, 44) and an insert peripheral surface (46) extending therebetween;
      a centrally located insert axis (C) extending through the insert top and bottom surfaces (42, 44);
      circumferentially alternating outer and inner corner portions (50, 52), the inner corner portions (52) being located closer to the insert axis (C) than the outer corner portions (50); wherein
         each outer corner portion (50) together with an adjacent first inner corner portion (52a) rotationally forward thereof and an adjacent second inner corner portion (52b) located rotationally rearward thereof define a cutting portion (54);
         each cutting portion (54) comprising a cutting edge (58) formed at the intersection of the insert top and peripheral surfaces (42, 46); and
      the cutting edge (58) comprises:
         a front chamfering cutting edge (58a) extending from the outer corner portion (50) to the first inner corner portion (52a);
         a back chamfering cutting edge (58b) extending from the outer corner portion (50) to the second inner corner portion (52b); and
         a curved non-operative corner edge (66) extending between the front and back chamfering cutting edges (58a, 58b).

2. The rotary milling cutter (20) according to claim 1, wherein:
   the outer and inner corner portions (50, 52) are distanced at two different radii, an outer radius ($R_O$) and an inner radius ($R_I$), from the insert axis (C), respectively.

3. The rotary milling cutter (20) according to claim 2, wherein the cutting insert (32) exhibits rotational symmetry about the insert axis (C).

4. The rotary milling cutter (20) according to claim 1, wherein the cutting insert (32) is double-sided and each cutting portion (54) comprises an additional cutting edge (58) formed at the intersection of the insert bottom and peripheral surfaces (44, 46).

5. The rotary milling cutter (20) according to claim 1, wherein at least one of the front and back chamfering cutting edges (58a, 58b) are straight.

6. The rotary milling cutter (20) according to claim 1, wherein the insert pocket (30) is located at a forward end of the cutter body (22).

7. The rotary milling cutter (20) according to claim 1, wherein a first length (L1) of the non-operative corner edge (66) is less than 25% of a second length (L2) of either the front or back chamfering cutting edges (58a, 58b).

8. The rotary milling cutter (20) according to claim 1, wherein:
   the cutter body (22) comprises a shank peripheral surface (26) extending circumferentially around the axis of rotation (A);
   the front and back chamfering cutting edges (58a, 58b) of one of the cutting portions (54) are disposed radially outwardly with respect to the shank peripheral surface (26), defining an active cutting portion (68).

9. The rotary milling cutter (20) according to claim 8, wherein the front and back chamfering cutting edges (58a, 58b) of the remaining cutting portions (54) are disposed radially inwardly with respect to the shank peripheral surface (26), defining a plurality of non-active cutting portions (70).

10. The rotary milling cutter (20) according to claim 8, wherein:
    in a side view of the rotary milling cutter (20), a bisector angle (β) is formed with the rearward direction ($D_R$) of the axis of rotation (A) and a bisector (B) of the outer corner portion (50) of the active cutting portion (68); and
    the bisector angle (β) is in range $70° \leq (β) \leq 110°$.

11. The rotary milling cutter (20) according to claim 10 wherein the bisector angle (β) is exactly 90°.

12. The rotary milling cutter (20) according to claim 1, wherein:
    the cutting insert (32) comprises exactly N cutting portions (50); and
    N is greater or equal to 3 and less than or equal to 9.

13. The rotary milling cutter (20) according to claim 12, wherein N is equal to 5.

14. The rotary milling cutter (20) according to claim 12, wherein N is an odd number.

15. The rotary milling cutter (20) according to claim 14, wherein the rotary milling cutter (20) comprises exactly one cutting insert (32).

16. The rotary milling cutter (20) according to claim 15, wherein the cutter body (22) comprises a shank peripheral surface (26) extending circumferentially around the axis of rotation (A);

the shank peripheral surface (26) has a shank diameter (S);

in a side view of the rotary milling cutter (20), the insert axis (C) is distanced from the axis of rotation (A) by an axis distance (D); and the axis distance (D) is less than 25% of the shank diameter (S).

17. The rotary milling cutter (20) according to claim 1, wherein the rotary milling cutter (20) comprises exactly one cutting insert (32).

18. The rotary milling cutter (20) according to claim 17, wherein the cutter body (22) comprises a shank peripheral surface (26) extending circumferentially around the axis of rotation (A);

the shank peripheral surface (26) has a shank diameter (S);

in a side view of the rotary milling cutter (20), the insert axis (C) is distanced from the axis of rotation (A) by an axis distance (D); and the axis distance (D) is less than 25% of the shank diameter (S).

19. The rotary milling cutter (20) according to claim 18, wherein the shank peripheral surface (26) has a shank diameter (S);

the outer corner portions (50) define an imaginary outer circle (OC) having an insert diameter (ID); and the insert diameter (ID) is larger than the shank diameter (S).

20. A double-sided star-shaped cutting insert (32), comprising opposing insert top and bottom surfaces (42, 44) and an insert peripheral surface (46) extending therebetween;

a centrally located insert axis (C) extending through the insert top and bottom surfaces (42, 44), the cutting insert (32) being indexable on each of the insert top and bottom surfaces (42, 44) about the insert axis (C);

circumferentially alternating outer and inner corner portions (50, 52), the inner corner portions (52) being located closer to the insert axis (C) than the outer corner portions (50);

a plurality of cutting portions (54), each cutting portion (54) defined by one of said outer corner portions (50), an adjacent first inner corner portion (52*a*) rotationally forward thereof and an adjacent second inner corner portion (52*b*) located rotationally rearward thereof;

a median plane (M) passing through the insert peripheral surface (46) midway between the top and bottom surfaces (42, 44);

a bisector plane (PS) formed at each cutting portion (54), each bisector plane (PS) containing the insert axis (C), and bisecting both an associated outer corner portion (50) and an associated opposite inner corner portion (52);

a median axis (AS) formed at an intersection of each bisector plane (PS) and the median plane (M), each median axis (AS) intersecting the insert axis (C), and passing through both an associated outer corner portion (50) and an associated opposite inner corner portion (52); wherein:

each cutting portion (54) comprising a cutting edge (58) formed at the intersection of the insert top and peripheral surfaces (42, 46);

each cutting edge (58) comprises:

a front chamfering cutting edge (58*a*) extending from the outer corner portion (50) to the first inner corner portion (52*a*);

a back chamfering cutting edge (58*b*) extending from the outer corner portion (50) to the second inner corner portion (52*b*); and a curved non-operative corner edge (66) extending between the front and back chamfering cutting edges (58*a*, 58*b*);

the cutting insert (32) has a number N cutting portions and is N-way indexable on both the top and bottom surfaces, N being 3, 5, 7 or 9;

the cutting insert (32) is mirror symmetrical about the median plane (M);

the cutting insert (32) is mirror symmetrical about each bisector plane (PS);

the cutting insert (32) is 180° rotationally symmetrical about each median axis (AS); and the cutting insert (32) is devoid of cutting edges which extend between top and bottom surfaces (42, 44) in a thickness direction of the cutting insert (32) parallel to the insert axis (C).

21. The cutting insert (32) according to claim 20, where N is equal to 5.

22. The cutting insert (32) according to claim 20, wherein a first length (L1) of the non-operative corner edge (66) is less than 25% of a second length (L2) of either the front or back chamfering cutting edges (58*a*, 58*b*).

23. The cutting insert (32) according to claim 20, wherein in a plan view of the cutting insert (32) the front chamfering cutting edge (58*a*) on any given cutting portion (54) and the adjacent back chamfering cutting edge (58*b*) rotationally forward thereof converge towards each other in a radially inward direction with respect to the insert axis (C).

24. A front and back chamfering rotary milling cutter (20), having an axis of rotation (A) around which the rotary milling cutter (20) rotates in a direction of rotation (R), the axis of rotation (A) extending in a forward ($D_F$) to rearward direction ($D_R$), the rotary milling cutter (20) comprising:

a cutter body (22) comprising an insert pocket (30); and a cutting insert (32) in accordance with claim 20 releasably retained in the insert pocket (30).

25. The rotary milling cutter (20) in accordance with claim 24, wherein:

the cutter body (22) comprises a shank peripheral surface (26) extending circumferentially around the axis of rotation (A);

the front and back chamfering cutting edges (58*a*, 58*b*) of one of the cutting portions (54) are disposed radially outwardly with respect to the shank peripheral surface (26), defining an active cutting portion (68); and in a side view of the rotary milling cutter (20), a bisector angle (β) is formed with the rearward direction ($D_R$) of the axis of rotation (A) and a bisector (B) of outer corner portion (50) of the active cutting portion (68); and the bisector angle (β) is in range $70° \leq (β) \leq 110°$.

* * * * *